Inventors
LEO PUNGS
KURT LAMBERTS
BERND GRIESBACH 3,322,928
CONTINUOUS DI-ELECTRIC HEATING OF ELECTRICALLY NON-CONDUCTIVE MATERIAL
Leo Pungs, 7 Hoehenblick, and Kurt Lamberts, 14 Liebermannstrasse, both of Braunschweig, Germany, and Bernd Griesbach, Braunschweig, Germany; said Griesbach assignor to said Pungs and said Lamberts
Original application Sept. 1, 1959, Ser. No. 837,554, now Patent No. 3,109,080, dated Oct. 29, 1963. Divided and this application Oct. 11, 1963, Ser. No. 327,569
Claims priority, application Germany, Sept. 2, 1958, P 21,288
5 Claims. (Cl. 219—10.53)

This case No. 327,569 is a division of No. 837,554 filed Sept. 1, 1959 now Patent No. 3,109,080.

Various methods and devices have become known, which serve for the heating of electrically non-conductive substances, particularly for the purpose of interwelding the same. The heating of the workpieces is effected either by contact heating or by a high frequency field, frequencies up to $60 \times 10^6$ cycles per second being used.

Heretofore, the electrodes serving for the heating of the workpieces by means of an electric field as well as for applying, if desired, the pressure required for the welding, have been made either as spot welding electrodes having an axial movement or in the form of rollers having a rotational movement. The high frequency energy has been supplied through simple cable leads connected to the electrodes and opposite electrodes, if desired, through "earth." Such arrangements can be used without difficulty on the high frequency side, as long as the working frequencies lie within a range for which the dimensions of the electrode system and of the driving members are small as compared with the wave length, so that the electric phenomena within the welding arrangement may be considered as quasi-stationary.

For substances having a comparatively high loss factor and not too high a welding temperature, the frequency required for an interwelding or a deformation lies within the said range, so that the known arrangements can be used.

Substances having a low loss factor, in particular fabrics made of thermoplastic synthetic fibres or even mixed fabrics, and substances having a comparatively high welding temperature cannot, however, be faultlessly welded at working frequencies up to $60 \times 10^6$ cycles per second, since the heating attainable with the substances and fabrics does not suffice for interwelding.

For the interwelding of the aforesaid substances accordingly high and very high frequencies are required, which lie in the range above $60 \times 10^6$ cycles per second up to some $1000 \times 10^6$ cycles per second. These frequencies correspond to wave lengths from 5 m. to about 10 cm. The known heating devices, however, are no longer suitable for these wave lengths since their dimensions are of the same order of magnitude as these wave lengths and the arrangement can no longer be considered as quasi-stationary. The supply of electric energy to the point of welding would be completely indeterminate and no heating sufficient for interwelding would occur. Moreover, a considerable proportion of the energy would be lost through radiation.

The principal object of the invention is to provide a method for the di-electric heating of non-conductive substances, particularly for the purpose of welding, in electric fields of high and very high frequency, which allows to interweld faultlessly even substances having a low loss factor, particularly fabrics of thermoplastic synthetic fibres and substances having comparatively high welding temperatures. A further object of the invention consists in providing devices for carrying out the said method which allow to adjust the optimum conditions for the supply of energy and its delivery to the point of heating or welding, and wherein the delivery of energy is controllable and adjustable in spite of the conditions no longer being quasi-stationary. There devices are moreover intended to have the advantage of minimum radiation losses into space, which is particularly important in view of suppression of interference. Finally they aim at the advantage of permitting the interwelding of substances which are not weldable by the methods hitherto known.

It has become known for the purpose of as uniform as possible a di-electric heating of stationary bodies of comparatively large dimensions (such as motor car tyres and the like) to arrange these bodies between the layers of a condenser and to include this condenser into a co-axial conductor system, one layer being connected to the inner conductor, and the other to the outer one. Such a method is, however, unsuitable for the heating and interwelding of continuously moving materials, particularly of foils and fabrics. Here it is not the uniform heating of a comparatively large body that matters, but on the contrary the heating and accordingly the electric field has to be concentrated in the shape of a point or seam. Moreover the workpieces have to be moved on between the electrodes.

The invention solves the problems set to it in that the high frequency energy is supplied in a manner known in itself through a co-axial conductor system or through a screened double conductor system symmetrical to "earth," and that through a gap in the inner conductor or inner conductor system between the two mutually juxtaposed small faces of the gap a strong electric field concentrated on this area is generated for the point- or seam-shaped heating or interwelding of the workpieces, the workpieces to be welded being moved through the field in a corresponding slot in the outer conductor or in the screening, respectively.

The concentration of the electric field on the faces of the gap in the inner conductor is attained in the co-axial system by a conductor section which is connected in series with the capacitance of the gap and tunable by means of a short-circuiting slide, which section is so adjusted that the voltage and the electric field in the gap assume the values most favourable for the welding.

In a double conductor system symmetrical to earth the concentration of the field in the gap is attained by arranging ahead of said gap appropriately dimensioned inductances in both conductors of the system.

The device according to the invention for carrying out this method may be so constructed that the electrodes themselves form the inner conductor of a co-axial system, which is interrupted at the points of heating, and which is enclosed by a co-axial outer conductor likewise interrupted at the point of heating, so that the workpiece can be passed through this gap which forms a capacitive short circuit for the working frequency.

In another embodiment the electrodes may, however, be so constructed that they themselves form parts of a conductor system symmetrical to "earth." Then the common screening is interrupted at the heating point by a gap for passing the workpiece to be heated through it, which gap acts as a short circuit for the working frequency.

The electrodes forming the inner conductor or parts thereof may be designed as roller electrodes.

The adjustment- and tuning-member included in the co-axial conductor system for adjusting the high frequency output at the heating point is established in that a second co-axial conductor system is formed by a second co-axial tubular conductor section of suitable diameter and length pushed over the outer conductor of the co-axial conductor system. Its effective length may be varied by a short-circuiting slide.

The adjustment- and tuning-member included into the co-axial conductor system for adjusting the high frequency output at the point of heating may alternatively be established by providing a second conductor section co-axial with the inner conductor of the co-axial conductor system and formed by a reduction of the diameter of the conductor and by a corresponding length of a tubular conductor surrounding the reduced inner conductor, the effective length of said tubular conductor being made variable by means of a short-circuiting slide.

The gap provided in the outer conductor or in the screening envelope thereof for passing through it the workpiece to be heated is provided with flanges or plane faces in order to increase its bridging capacitance.

The invention is illustrated in the drawings by way of example in various embodiments. In the drawings.

Figure 1:
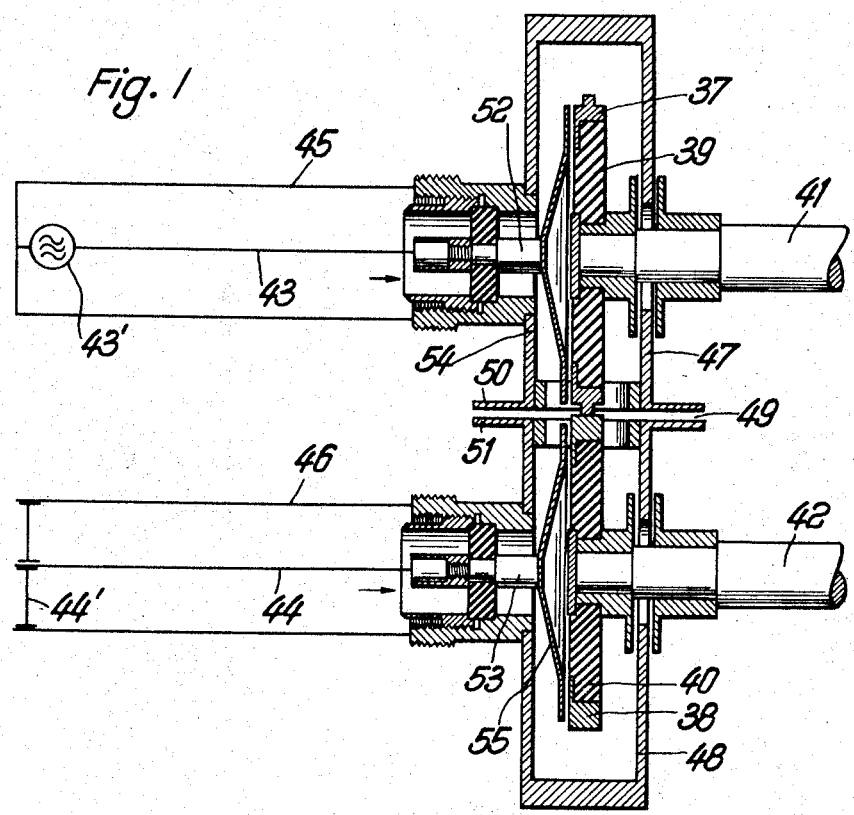
FIG. 1 is a section of an embodiment having roller electrodes.

In the embodiment of FIG. 1 the possibility of structural application of the principle of the invention is shown when using roller electrodes.

Two roller electrodes 37, 38 are mounted on insulating roller bodies 39, 40 which are fixed on drive shafts 41, 42. The supply of the high frequency energy is effected through the co-axial cable having an outer conductor 45 and an inner conductor 43. The source of energy is a high frequency generator 43'. In alignment with the axle 42 of the roller 40 lies a co-axial conductor having an outer conductor 46 and an inner conductor 44 as a tuning system. The tuning itself is effected through a short-circuiting slide 44'. The outer conductors 45, 46 are enlarged in the form of capsule-shaped metal casings 47, 48 which enclose the roller bodies 39, 40 and electrodes 37, 38 except for a narrow gap 49. By flange-shaped extensions 50, 51 the capacitive closing of the outer conductors 45, 46 through the gap 49 is improved. The inner conductor 52, 53 is enlarged by the rims of the roller electrodes 37, 38. The connections of the roller electrodes 37, 38 to the inner conductors 52, 53 and to the tuning system is effected by means of capacitive couplings 54, 55.

In this manner a homogeneous and defined co-axial system, which is closed outwardly, is formed also in the embodiment just described.

Although the co-axial system has substantial advantages because of the simpler structural fittings of the electrodes into the conductors and because of dispensing with symmetry, one may yet use in principle also the symmetrical parallel conductor system, preferably with cylindrical screening, which permits likewise to attain positively defined voltage conditions at the point of heating, provided correct symmetry and corresponding adaptations are made.

Figure 2:
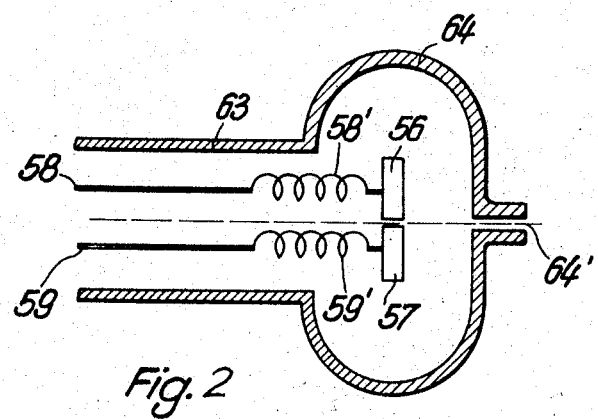
FIG. 2 is an embodiment of a screened parallel conductor arrangement having roller electrodes, illustrated diagrammatically.

As an example of the application of a screened symmetrical parallel conductor system in the sense of the invention, an arrangement having roller electrodes is diagrammatically illustrated in FIG. 2. To the roller electrodes 56, 57 supply leads 58, 59 are connected into which inductances 58', 59' are inserted which serve for tuning the system. These inductances 58', 59' may be adjustable. In many cases they may however be built in fixedly when appropriately dimensioned.

The whole system is surrounded by a cylindrical screening 63, which encloses the rollers 56, 57 in an enlargement 64 wherein a working slot 64' is provided.

The illustration is made merely diagrammatically in order to explain the principle. In practice the leads are coupled capacitively to the rollers, in order to dispense with slip rings.

For the simultaneous production of two weld seams lying at a spacing parallel to one another in a device of the kind described hereinabove the working condenser may be subdivided into two working condensers. This may be effected in that an electrically conductive element is inserted into the gap between the electrodes.

Figure 3:
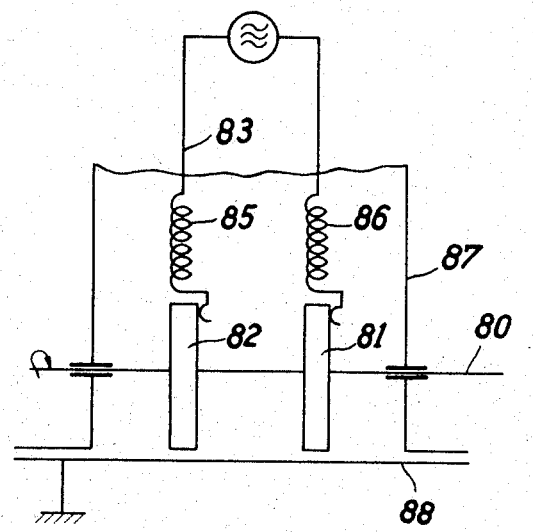
FIG. 3 shows a device having a divided working condenser in a double connector system symmetrical to earth.

In FIG. 3 such an arrangement is illustrated for a screened double conductor system symmetrical to "earth." On a common shaft two rollers 81, 82 are here mounted, which are insulated from one another and to which the conductors 83, 84 are connected through tuning inductances 85, 86. The screening envelope is denoted 87. Opposite the rollers 81, 82 lies an electrically conductive plate 88, which may lie on "earth." The gaps between the rollers 81 and 82, respectively, and the plate 88 form the part-working condensers, by the aid of which the welding is carried out. As in the other embodiments described hereinabove, the rollers apply a pressure in the direction of the field, so that heating and pressure occur on the same point of the material.

This arrangement safeguards absolute freedom from interference even when the two working condensers are unequally loaded, for example when the numbers of layers of material at the two welding points are unequal.

Figure 4:
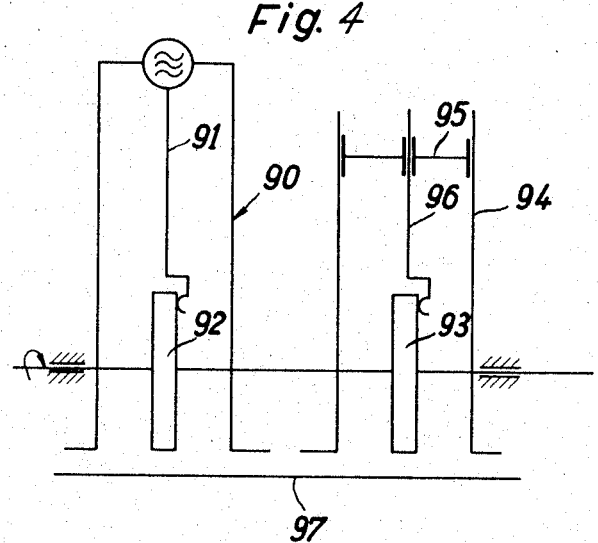
FIG. 4 shows a co-axial conductor system having a divided working condenser.

In FIG. 4 a design similar to that of FIG. 3 is illustrated, however for a co-axial conductor system. The supply of energy is here effected through the co-axial conductors 90. At the end of the inner conductor 91 again a roller 92 is arranged, which is mounted on a common shaft with a roller 93 in the tuning portion 94 of the system. The rollers are again insulated from one another. The tuning is effected by a short-circuiting slide 95. The inner conductor 96 of the tuning portion is connected to the roller 93.

Opposite the rollers 92, 93 again an electrically conductive plate 97 is arranged. Here, too, the fields effecting the welding are formed between the rollers 92 and 93, respectively, and the plate 97, namely perpendicular to the plate 97.

The plate 97 of the design according to FIG. 4, as by the way also the plate 88 of the design according to FIG. 3, need not necessarily be a plane plate; on the contrary the welding fields may be made to lie at an angle to one another by an appropriate formation of the plate and arrangement of the rollers.

As will be seen in FIGS. 3 and 4, the ends of both conductors (i.e. the electrodes) may lie on the same side of the said electrically conductive element. The latter may form the working table, if desired.

While we have described herein and illustrated in the accompanying drawings what may be considered typical and particularly useful embodiments of our said invention, we wish to be understood that we do not limit ourselves to the particular details and dimensions described and illustrated; for obvious modifications will occur to a person skilled in the art.

What we claim as our invention and desire to secure by Letters Patent, is:

1. In a device for the continuous dielectric heating and interwelding of progressively moved electrically non-conductive material, in combination with a source of high frequency electric energy of at least $60 \times 10^6$ c.p.s., a coaxial high frequency conductor system connected to said source, which conductor system comprises two inner conductors, two roller electrodes each terminating one of said inner conductors and having contacting edges adapted to form a gap when the non-conductive material is inserted therebetween thereby including between one another said working condenser, two outer conductors co-axially surrounding said inner conductors and roller electrodes, respectively, and including between one another a slot in alignment with the said gap of the inner conductors, and tuning element means included in the coaxial conductor system and being in series with the working condenser in said system, one of the inner conductors and the associated outer conductor being connected to said source of high frequency energy.

2. A device as claimed in claim 1, comprising flange-shaped enlargements of the said two outer conductors adjacent the said slot increasing the bridging-over capacitance thereof.

3. In a device for the continuous dielectric heating and interwelding of progressively moved electrically non-conductive material, in combination with a source of high frequency electric energy of at least $60 \times 10^6$ c.p.s, a co-axial high frequency conductor system connected to said source, which conductor system comprises two inner conductors, two roller electrodes each terminating one of said inner conductors; electrically conductive plate means disposed in spaced relation with said roller electrodes for forming the working condensers therebetween, two outer conductors co-axially surrounding said inner conductors and roller electrodes, respectively, and spaced from said electrically conductive plate means, one of the inner conductors and the associated outer conductor being connected to said source of high frequency energy, and tuning means included in the co-axial conductor system in association with the other of the inner conductors and its associated outer conductor.

4. The device of claim 3 wherein said roller electrodes are disposed in side-by-side relation and are oriented perpendicularly relative to the electrically conductive plate means to produce electrical fields normal to the plate means.

5. The apparatus of claim 3 wherein said roller electrodes are disposed in side-by-side relation and are oriented to define an included angle therebetween being out of normal relative to the said electrically conductive plate means thereby producing electrical fields in angular relation with the plate means.

References Cited

UNITED STATES PATENTS

| | | | |
|---|---|---|---|
| 2,465,102 | 3/1949 | Joy | 219—10.53 |
| 2,468,263 | 4/1949 | Joy | 219—10.53 X |
| 2,569,717 | 11/1950 | Wenger | 219—10.53 X |
| 2,569,968 | 10/1951 | Autie et al. | 219—10.53 X |
| 3,109,080 | 10/1963 | Pungs et al. | 219—10.53 |

RICHARD M. WOOD, *Primary Examiner.*

L. H. BENDER, *Assistant Examiner.*